May 22, 1956     H. R. KRAYBILL     2,746,870
ANTIOXIDANT COMPOSITION
Filed Jan. 2, 1952
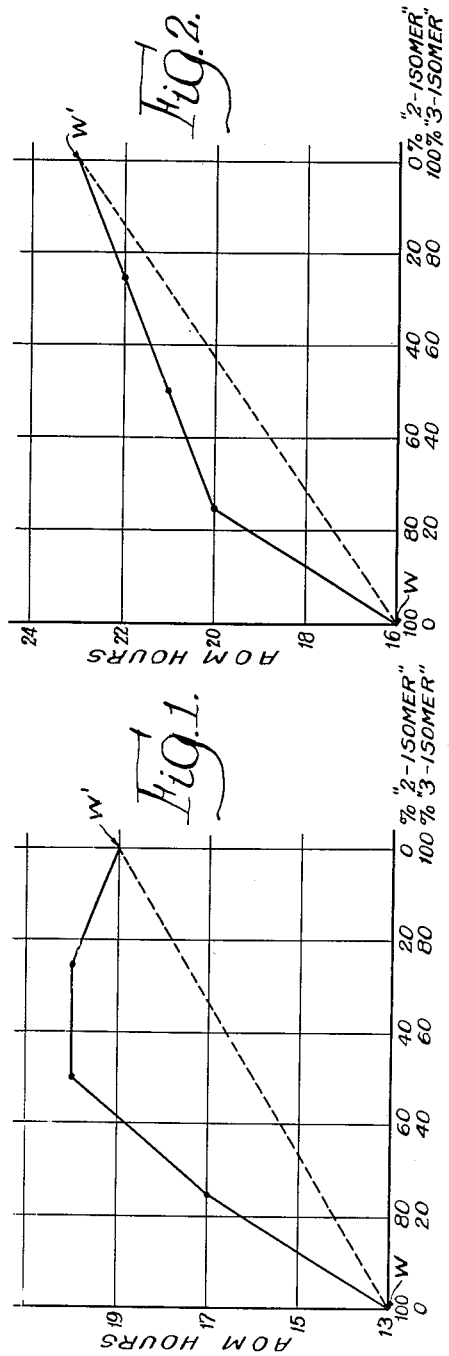
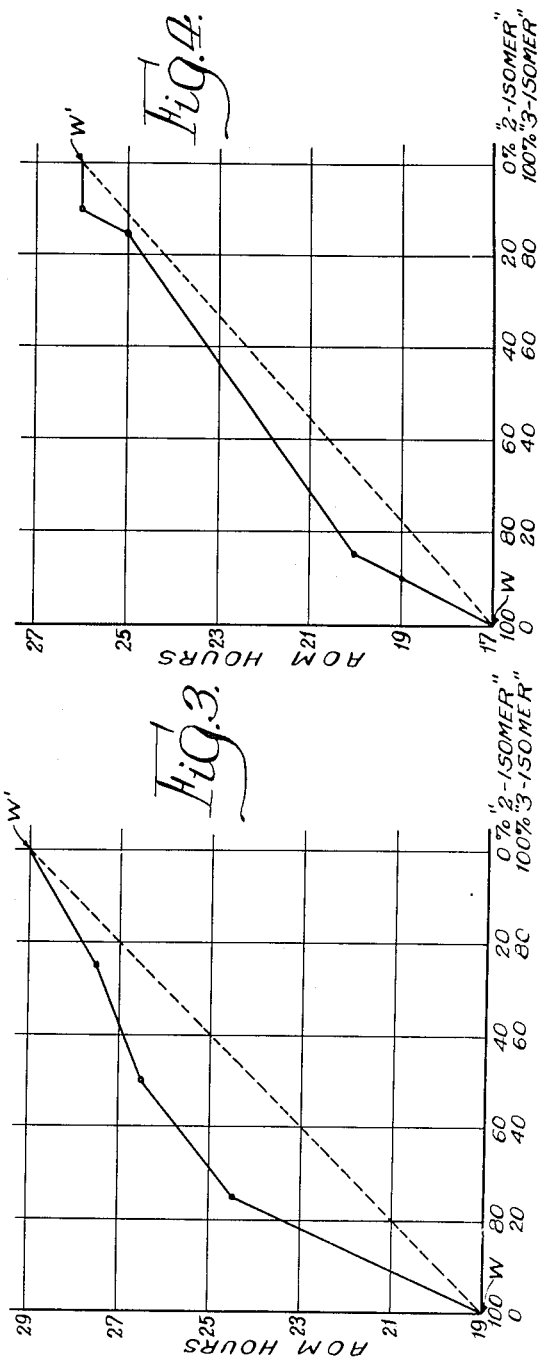
INVENTOR.
Henry R. Kraybill,
BY
Attys.

United States Patent Office 2,746,870
Patented May 22, 1956

2,746,870
ANTIOXIDANT COMPOSITION

Henry R. Kraybill, Chicago, Ill., assignor to A. W. Brickman, Victor Conquest, Frank J. Madden, Wrisley B. Oleson, and Emery T. Filbrey, as trustees for the benefit of American Meat Institute Foundation, Chicago, Ill., a nonprofit corporation of Illinois Application January 2, 1952, Serial No. 264,401

2 Claims. (Cl. 99—163)

The present invention relates generally to the stabilization of materials normally subject to the deteriorating effect of oxidative rancidity, and it has particular relation to such materials stabilized by the incorporation therein of mixtures of 2-tertiary butyl-4-hydroxyanisole and 3-tertiary butyl-4-hydroxyanisole.

The present invention is particularly useful in connection with the stabilization of lard but as indicated above the field of application is by no means limited to this particular animal fat, and animal and vegetable fats and oils in general may be stabilized in accordance with my present invention.

This application is a continuation-in-part of my now abandoned application Serial No. 51,657, filed September 28, 1948.

It is generally recognized that a satisfactory anti-oxidant for animal and vegetable fats and oils must suitably meet the following requirements:

1. Should be non-toxic in effective stabilizing concentration.
2. Must be effective in minute concentration, that is in the order of the small fraction of a percent.
3. Should exhibit high "Carry-Through" properties, that is it must remain effective as an antioxidant in the fat or oil even after the same has been utilized in cooking, baking, frying, or other heat processing operation.
4. Must be available both in high purity and uniform quality and reasonable cost.
5. Must not impart color or odor to the material stabilized.
6. Must not affect the taste of the material stabilized.
7. It should be soluble and remain uniformly distributed throughout the material stabilized.

Obviously, the foregoing essential requirements for antioxidants for animal or vegetable fats and oils are both manifold and exacting, with the result that only a very few materials have been provided which are satisfactory for this purpose.

One material which has been shown to be extremely useful in this regard is the compound known as 3-tertiary butyl-4-hydroxyanisole (also named 2-tertiary butyl-4-methoxyphenol). While this compound does possess properties which set it high above other antioxidants in meeting the requirements hereinbefore set forth, its production in pure form is difficult, slow and expensive. The reason for this is that in producing 3-tertiary butyl-4-hydroxyanisole in accordance with well known methods, there is simultaneously produced a position isomer, namely 2-tertiary butyl-4-hydroxyanisole, and the isolation of these two isomers and their separation from each other involves rather elaborate techniques.

The present invention is based on my discovery that not only does 2-tertiary butyl-4-hydroxyanisole, which has hitherto been considered to possess little or no antioxidant potency, indeed have a substantial amount of antioxidant power, but that the co-presence of 3-tertiary butyl-4-hydroxyanisole and 2-tertiary butyl-4-hydroxyanisole results in a synergistic phenomenon whereby the inhibitor potency of the mixture of 2 and 3-tertiary butyl-4-hydroxyanisole is greater than the sum total of the individual potencies of these two compounds. Indeed in the case of some lards, I have made the further surprising discovery that some mixtures of 2 and 3 tertiary butyl-4-hydroxyanisole are even more powerful antioxidants than pure 3-tertiary butyl-4-hydroxyanisole itself.

This discovery is of substantial commercial advantage since, because of the synergistic character of mixtures of 2-tertiary butyl-4-hydroxyanisole and 3-tertiary butyl-4-hydroxyanisole, it is not only practical but even preferable to use these mixtures, rather than pure 3-tertiary butyl-4-hydroxyanisole.

The aforesaid discovery of the synergistic character of mixtures of 2-tertiary butyl-4-hydroxyanisole and 3-tertiary butyl-4-hydroxyanisole was entirely unexpected since prior work done in this field does not indicate that in general such isomers would be so effective and, in fact, only the 3-tertiary butyl-4-hydroxyanisole isomer has been found effective as an antioxidant for gasoline.

The object of this invention, broadly stated, is the provision of materials normally subject to the deteriorating effect of oxidative rancidity such as animal and vegetable fats and oils, which materials are stabilized against such deterioration by the incorporation therein of a small amount of a mixture of isomers of butylated hydroxy anisole namely 2-tertiary butyl-4-hydroxyanisole and 3-tertiary butyl-4-hydroxyanisole.

Certain more specific objects of the invention will be obvious as will appear hereinafter.

It is to be understood that the present invention lies not in the use of either the 2-tertiary butyl-4-hydroxyanisole or 3-tertiary butyl-4-hydroxyanisole alone, but rather in the utilization of certain mixtures of these two isomers, it having been discovered that there is a synergizing effect when these two isomers are used concurrently in accordance with the invention.

This unexpected synergistic effect of mixtures of 2-tertiary butyl-4-hydroxyanisole and 3-tertiary butyl-4-hydroxyanisole is illustrated in the following tables and in the drawings hereto annexed.

The data shown in the following tables was obtained by treating four different samples of lard with small amounts of 2-tertiary butyl-4-hydroxyanisole, 3-tertiary butyl-4-hydroxyanisole, and mixtures consisting of various proportions.

The stability of all samples of treated and untreated lard was determined by the Swift stability test and recorded as A. O. M. hours. The values attributed to mutual synergism were determined by comparing the calculated "difference from control" values which were to be expected for each lard treated with a mixture of 2-tertiary butyl-4-hydroxyanisole and 3-tertiary butyl-4-hydroxyanisole, with the experimentally found "difference from control" for each such mixture. The term "difference from control" refers to the difference in A. O. M. hours between the stability of an untreated lard and the stability of the same lard containing an antioxidant material.

Referring to the table, it is seen that lard #1 had on A. O. M. stability on 4 hours. Addition of 0.01% of 2-tertiary butyl-4-hydroxyanisole to the lard increased the stability to 17 hours. The experimentally found "difference from control" due to the presence of 2-teritary butyl-4-hydroxyanisole is seen to be 17 minus 4, or 13 hours. Similarly, the experimentally found "difference from control" due to 3-tertiary butyl-4-hydroxyanisole is seen to be 23 minus 4 or 19 hours. Referring now to "lard #1+0.01% of mixture A," (mixture A consisting of 75% of 3-tertiary butyl-4-hydroxyanisole and 25% of 2-tertiary butyl-4-hydroxyanisole), the calculated "difference from control" is determined as follows:

"Difference from control" due to presence of 3-tertiary butyl-4-hydroxyanisole=19 hours.

"Difference from control" due to presence of 2-teritary butyl-4-hydroxyanisole=13 hours.

¾×19+¼×13=17.5 hours, calculated difference from control.

That is to say, it would be expected that "lard #1+0.01% of mixture A" would have an A. O. M. stability of 17.5 hours. However, it is seen, in the column headed "Found Difference from Control," that the stability was not the expected 17.5 hours, but 20 hours. The difference between the expected and the actual stability, 2.5 hours, is due to the mutual synergism of the 2-teritary butyl-4-hydroxyanisole and 3-teritary butyl-4-hydroxyanisole when co-present in lard.

The calculated "difference from control" was determined, as seen in the table, not only with other samples of lard, but likewise with other mixtures (mixtures B and C of 2 and 3-tertiary butyl-4-hydroxyanisole).

Table A

| Sample | A. O. M. Stability (in hours) | Calculated Difference from control (in hrs.) | Found Difference from control (in hours) | Synergism (in hrs.) |
|---|---|---|---|---|
| Lard #1 (control) | 4 | | | |
| Lard #1+0.01% of pure "2-isomer" | 17 | | 13 | |
| Lard #1+0.01% of pure "3-isomer" | 23 | | 19 | |
| Lard #1+0.01% of Mixture A | 24 | 17.5 | 20 | +2.5 |
| Lard #1+0.01% of Mixture B | 24 | 16 | 20 | +4.0 |
| Lard #1+0.01% of Mixture C | 21 | 14.5 | 17 | +2.5 |
| Lard #2 (control) | 11 | | | |
| Lard #2+0.01% of pure "2-isomer" | 27 | | 16 | |
| Lard #2+0.01% of pure "3-isomer" | 34 | | 23 | |
| Lard #2+0.01% of Mixture A | 33 | 21.25 | 22 | +0.75 |
| Lard #2+0.01% of Mixture B | 32 | 19.5 | 21 | +1.5 |
| Lard #2+0.01% of Mixture C | 31 | 17.75 | 20 | +2.25 |
| Lard #3 (control) | 11 | | | |
| Lard #3+0.01% of pure "2-isomer" | 30 | | 19 | |
| Lard #3+0.01% of pure "3-isomer" | 40 | | 29 | |
| Lard #3+0.01% of Mixture A | 38.5 | 26.5 | 27.5 | +1 |
| Lard #3+0.01% of Mixture B | 37.5 | 24.0 | 26.5 | +2.5 |
| Lard #3+0.01% of Mixture C | 35.5 | 21.5 | 24.5 | +3 |

In the above table:
"2-isomer" refers to 2-tertiary butyl-4-hydroxyanisole.
"3-isomer" refers to 3-tertiary butyl-4-hydroxyanisole.
Mixture A consists of 75% of 3-tertiary butyl-4-hydroxyanisole and 25% of 2-tertiary butyl-4-hydroxyanisole.
Mixture B consists of a 50-50 mixture of 3-tertiary butyl-4-hydroxyanisole and 2-tertiary butyl-4-hydrosyanisole.
Mixture C consists of 25% of 3-tertiary butyl-4-hydroxyanisole and 75% of 2-tertiary butyl-4-hydroxyanisole.

Table B

| Sample | A. O. M. Stability (in hours) | Calculated Difference from control (in hrs.) | Found Difference from control (in hours) | Synergism (in hrs.) |
|---|---|---|---|---|
| Control Lard | 10 | | | |
| Lard+0.01% of a mixture of 90% of "3-isomer," 10% of "2-isomer" | 36 | 25.1 | 26 | 0.9 |
| Lard+0.01% of a mixture of 10% of "3-isomer," 90% of "2-isomer" | 29 | 17.9 | 19 | 1.1 |
| Lard+0.01% of a mixture of 85% of "3-isomer," 15% of "2-isomer" | 35 | 24.65 | 25 | 0.35 |
| Lard+0.01% of a mixture of 15% of "3-isomer," 85% of "2-isomer" | 30 | 18.35 | 20 | 1.65 |
| Lard+0.01% of pure "3-isomer" | 36 | | 26 | |
| Lard+0.01% of pure "2-isomer" | 27 | | 17 | |

The data of Tables A and B is expressed in graphical form in the drawings wherein:

Figure 1 is a graphic representation of the data obtained in connection with lard #1 of Table A Figure 2 shows a graph of the data obtained in connection with lard #2 of Table A Figure 3 shows a graph of the data obtained in connection with lard #3 of Table A Figure 4 shows a graph of data obtained in connection with lard #4 of Table B.

Referring to Figure 1 of the drawing, point W on the graph indicates the stabilizing effect (in A. O. M. hours) on lard #1, of 0.01% of 3-tertiary butyl-4-hydroxyanisole; point W' indicates the effect of 0.01% of 2-tertiary butyl-4-hydroxyanisole on lard #1.

It would naturally be expected that the stabilizing effect of mixtures of 3-tertiary butyl-4-hydroxyanisole and 2-tertiary butyl-4-hydroxyanisole would lie along the dotted straight line connecting points W and W'.

However, the stabilizing effect of mixtures of 3-tertiary butyl-4-hydroxyanisole and 2-tertiary butyl-4-hydroxyanisole was found to be surprisingly greater than expected, and to lie along the solid line connecting W and W'.

Similarly, Figures 2, 3 and 4 illustrate the unexpected stabilizing effect of mixtures of 3-tertiary butyl-4-hydroxyanisole and 2-tertiary butyl-4-hydroxyanisole on lards #2, #3 and #4.

It is seen from the above experimental data, as set forth in Tables A and B and Figures 1, 2, 3 and 4, that in every instance the inhibitor potency of mixtures of 2-tertiary butyl-4-hydroxyanisole and 3-tertiary butyl-4-hydroxyanisole was greater than would be expected, and in some instances as with lard No. 1, mixtures of the isomers turned out to be even more effective than the most effective of the pure isomers.

It will be understood that the amount of the mixture of the isomers used for stabilizing any particular material such as lard, should be kept to a minimum consistent with obtaining adequate stabilization. Generally speaking only a fraction of one per cent is required in any instance. Generally no more than 0.01% will be required in the case of edible fats or oils. However higher concentrations may be used in stabilizing fats or oils for non-edible purposes.

The particular method by which the antioxidants are incorporated into the material to be stabilized is not critical. The antioxidant may desirably be first dissolved in high concentration in a small portion of the material to be stabilized and the resulting concentration then blended with the remaining bulk or, the antioxidant may be dissolved in a solvent such as propylene glycol and then incorporated in the bulk of the material to be stabilized in the form of such a solution.

Having fully described by invention and best method of practicing the same what is claimed as new is:

1. Lard containing not over about 0.01% of a mixture comprising 2-tertiary butyl-4-hydroxyanisole and 3-tertiary butyl-4-hydroxyanisole containing from about 10% to 90% based on the said mixture, of 2-tertiary butyl-4-hydroxyanisole.

2. A method of stabilizing lard which comprises incorporating therein up to about 0.01% of a mixture comprising 2-tertiary butyl-4-hydroxyanisole and 3-tertiary butyl-4-hydroxyanisole containing from about 10% to 90% based on the said mixture, of 2-tertiary butyl-4-hydroxyanisole.

References Cited in the file of this patent
UNITED STATES PATENTS
2,459,540    Rosenwald _____ Jan. 18, 1949

OTHER REFERENCES
Food Industries, March 1949 (vol. 409), page 186.